(12) United States Patent
Lorenz

(10) Patent No.: US 6,867,470 B1
(45) Date of Patent: Mar. 15, 2005

(54) MULTI-SLOPE ANALOG TEMPERATURE SENSOR

(75) Inventor: Perry Scott Lorenz, Fort Collins, CO (US)

(73) Assignee: National Semiconductor Corporation, Santa Clara, CA (US)

(*) Notice: Subject to any disclaimer, the term of this patent is extended or adjusted under 35 U.S.C. 154(b) by 140 days.

(21) Appl. No.: 10/268,215

(22) Filed: Oct. 9, 2002

(51) Int. Cl.[7] .......................... H01L 31/058; G01K 7/00
(52) U.S. Cl. .................... 257/470; 257/467; 257/469; 374/178
(58) Field of Search .................. 257/467–470; 374/178, 172; 327/512–513

(56) References Cited

U.S. PATENT DOCUMENTS

| | | | | |
|---|---|---|---|---|
| 3,777,289 A | * | 12/1973 | Makino | .................. 334/15 |
| 4,395,139 A | * | 7/1983 | Namiki et al. | .............. 374/178 |
| 5,062,065 A | * | 10/1991 | Lampe | ..................... 702/85 |
| 5,070,322 A | * | 12/1991 | Fujihira | ................... 340/653 |
| 5,982,221 A | * | 11/1999 | Tuthill | ...................... 327/512 |
| 2002/0014675 A1 | * | 2/2002 | Matsumoto et al. | ........ 257/470 |

* cited by examiner

Primary Examiner—Shouxiang Hu
(74) Attorney, Agent, or Firm—Merchant & Gould P.C.; Timothy P. Sullivan

(57) ABSTRACT

The present invention provides a temperature sensor that has high sensitivity and operates in a wide range of temperatures and VDD levels. The temperature sensor may be tailored to the application according to the conditions of temperature and VDD. The temperature sensor comprises five PNP junctions in series. The temperature sensor includes a switch that is configured to block out a predetermined number of the junctions. For example, two junctions may be blocked out. Depending on the state of the switch, the temperature sensor either blocks out a predetermined number of the junctions or operates with all of the junctions active. Blocking out the number of active junctions reduces the sensitivity of the temperature sensor for applications at low temperature and low VDD. The switch may be controlled automatically, or the switch may be hardwired. When the switch is adjusted automatically, a circuit could adjust the switch in response to the temperature information and Vdd conditions.

16 Claims, 4 Drawing Sheets

MULTI-SLOPE ANALOG TEMPERATURE SENSOR

FIELD OF THE INVENTION

The present invention is related to electronic circuits, and more specifically to circuits relating to temperature sensors.

BACKGROUND OF THE INVENTION

Temperature sensors are used in a wide variety of applications. Typically electronic devices are temperature sensitive and require temperature information in order to be able to protect the device from extreme temperatures. For example, the device may use the temperature information to control the speed of a fan. In other devices, the temperature information may be used to shut down the device when a predetermined temperature is reached or exceeded. The wide range of requirements for devices has led to the development of many different temperature sensors.

Some temperature sensors provide a wide range of temperature measurement, whereas other temperature sensors may only provide temperature information for a small temperature range. In addition to the temperature range sensed, the sensitivity and the accuracy of temperature sensors may also vary widely. Additionally, some temperature sensors work at high voltages while others only work at low voltages.

What is needed is a temperature sensor that has high sensitivity, can work in a large range of temperatures as well as a range of voltages.

SUMMARY OF THE INVENTION

Briefly described, the present invention is directed at providing a temperature sensor that has high sensitivity and operates in a wide range of temperatures. The temperature sensor may be tailored to the application.

According to one aspect of the invention, the temperature sensor comprises five PNP junctions in series. The sensor works well over a wide temperature range and has high temperature sensitivity.

According to another aspect of the invention, the temperature sensor includes a switch that is configured to block out a predetermined number of the PNP junctions. Depending on the state of the switch, the temperature sensor either blocks out a predetermined number of the junctions or operates with all of the junctions active. Blocking out a number of the active junctions reduces the sensitivity of the temperature sensor, but still allows the sensor to measure temperatures within a wide temperature range.

According to yet another aspect of the invention, the switch may be controlled automatically, or the switch may be hardwired. When the switch is adjusted automatically, a circuit may adjust the switch in response to conditions relating to the device, such as the temperature information and Vdd conditions.

DETAILED DESCRIPTION OF THE PREFERRED EMBODIMENT

Figure 1:
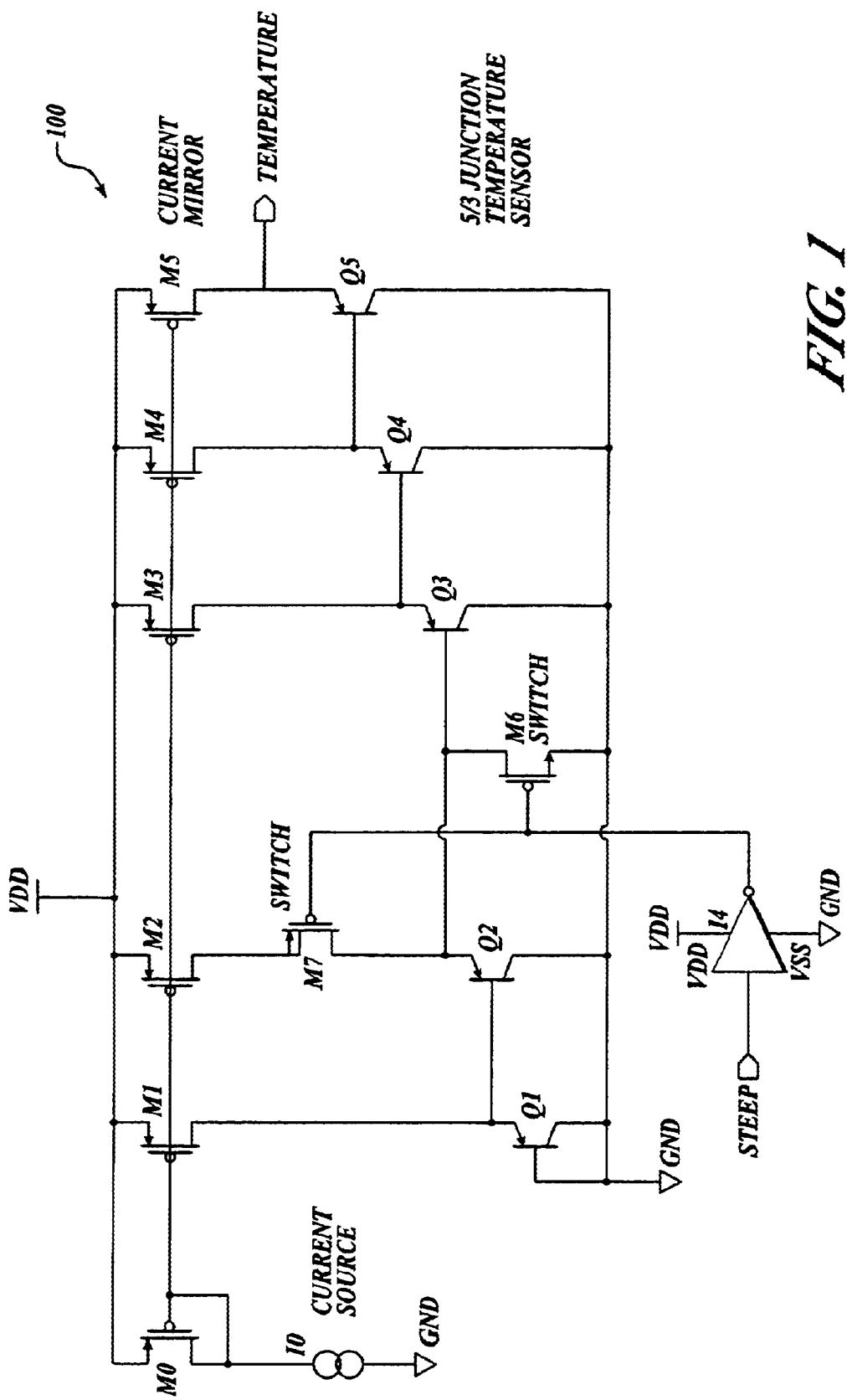
FIG. 1 illustrates a schematic diagram of a temperature sensor.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

Briefly described, the present invention is directed at providing a temperature sensor with high sensitivity and operating in a wide variety of conditions.

FIG. 1 illustrates a schematic diagram of a temperature sensor, in accordance with aspects of the invention.

As shown in the figure, temperature sensor 100 includes five PNP junctions (Q1, Q2, Q3, Q4, and Q5) biased by five current sources (M1–M5), and a switches M6 and M7.

The temperature sensor is directed at providing high temperature sensitivity that can be used over a wide temperature range. The temperature sensor's sensitivity may be hardwired, or may be controlled by activating or deactivating the steep input.

Transistors M6 and M7 are configured as sensitivity switches to adjust the sensitivity of temperature sensor 100 by controlling the active number of junctions that are used to sense the temperature. According to one embodiment of the invention, two of the five junctions (Q1 and Q2) are blocked out thereby reducing the sensitivity of the temperature sensor to three active junctions (Q3, Q4, and Q5).

When set to low sensitivity (only 3 junctions active), the temperature sensor can accommodate a wide temperature range, even when Vdd is low. For example, according to one embodiment, when the temperature sensor is set to low sensitivity, the temperature sensor may be used down to −55° C. with a Vdd as low as 2.5V. When Vdd is 1.9V and the temperature sensor is set to low sensitivity it may used down to 0° C.

When the temperature sensor is set to high sensitivity (all 5 junctions active) then the highest sensitivity is achieved.

For example, according to one embodiment, when Vdd is 3.5V or higher, the temperature sensor works well over the full temperature range down to −55° C. (See FIG. 2). Other numbers of PNP junctions may be used within the temperature sensor.

This temperature sensor provides many advantages. One advantage is that the temperature sensor does not run out of headroom at low temperatures, as compared to a temperature sensor that uses four substrate vertical PNP junctions.

Another advantage is that five junctions provide higher sensitivity than as compared to a lower number of junctions.

Figure 2:
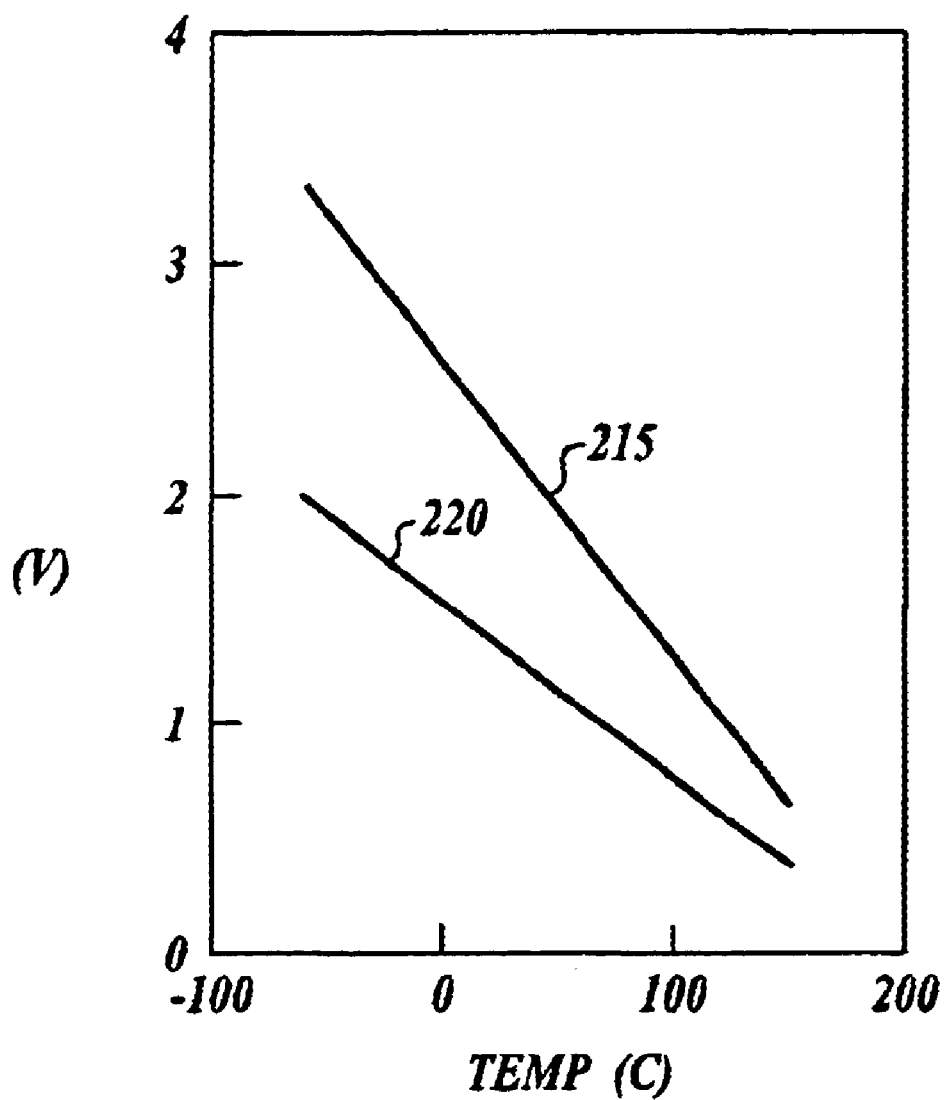
FIG. 2 illustrates an exemplary graph showing the two slopes of the temperature sensor at a low sensitivity setting and a high sensitivity setting.

FIG. 2 illustrates an exemplary graph showing the two slopes of the temperature sensor at a low sensitivity setting and a high sensitivity setting, in accordance with aspects of the invention.

As shown in the figure, line 215 illustrates when the temperature sensor is set to high sensitivity. According to one embodiment of the invention, when the temperature sensor is set to high sensitivity, all PNP junctions are turned on.

Line 220 illustrates when the temperature sensor is set to low sensitivity. According to one embodiment of the invention, when the temperature sensor is set to low sensitivity there are fewer number of active PNP junctions.

An advantage of high sensitivity when compared with limited offsets, greater accuracy can be achieved. As can be seen by comparing the low sensitivity slope to the high sensitivity slope, the temperature sensor has higher resolution at the high sensitivity setting. The high sensitivity setting, however, requires a larger VDD. It can be seen, however, that the temperature sensor can accommodate a wide temperature range both in the high sensitivity and low sensitivity setting depending on the VDD level.

Figure 3:
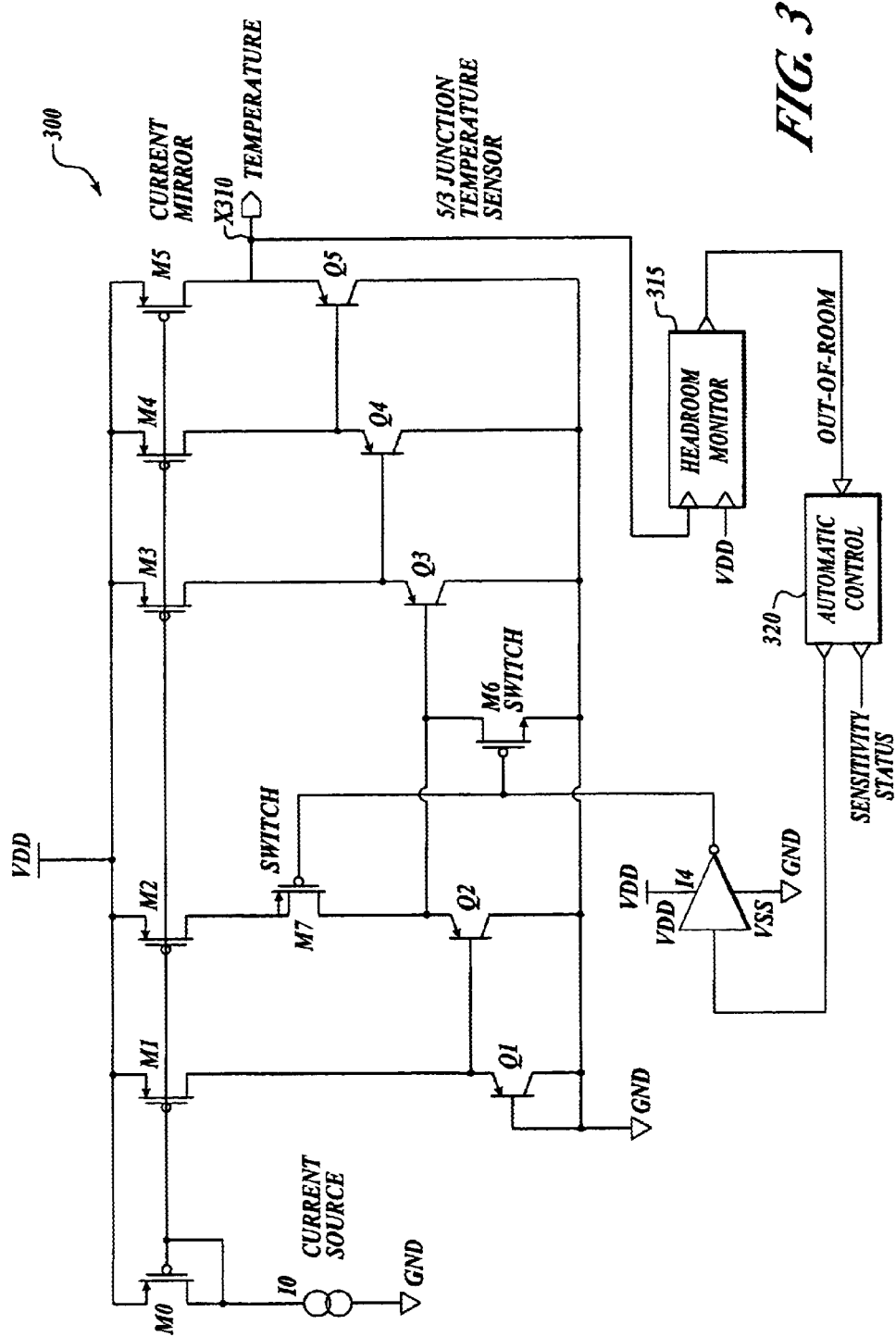
FIG. 3 illustrates a schematic diagram of a temperature sensor with automatic sensitivity control.

FIG. 3 illustrates a schematic diagram of a temperature sensor with automatic sensitivity control, in accordance with aspects of the invention. The temperature sensor illustrated in FIG. 3 is similar to the temperature sensor illustrated in FIG. 1. The differences include headroom monitor circuit 315, and automatic control circuit 320.

Headroom monitor circuit 315 monitors the headroom of the circuit. Headroom monitor circuit 315 includes an input coupled to Vdd, an input coupled to node X310 (temperature), and an output configured to output a signal (out-of-room) relating to whether there is any headroom. According to one embodiment of the invention, the out-of-room signal is a logical high ("1") when there is no headroom (Vdd-temperature<−100 mV), and a logical low ("0") when there is headroom (Vdd-temperature>100 mV).

Automatic control circuit 320 includes an input coupled to the out-of-room signal, an output coupled to sensitivity circuit 310, and an optional output for providing sensitivity status information. Automatic control circuit 320 is configured to set the state of the switch based on the out-of-room signal. When the out-of-room signal indicates there is no headroom, automatic control circuit 320 outputs a sensitivity signal instructing switch M6 to block a predetermined number of PNP junctions (in this particular example two of the five PNP junctions will be blocked). Other configurations for setting the sensitivity of the switch may be used. For example, the state of the switch could be set just using the sensed temperature.

Figure 4:
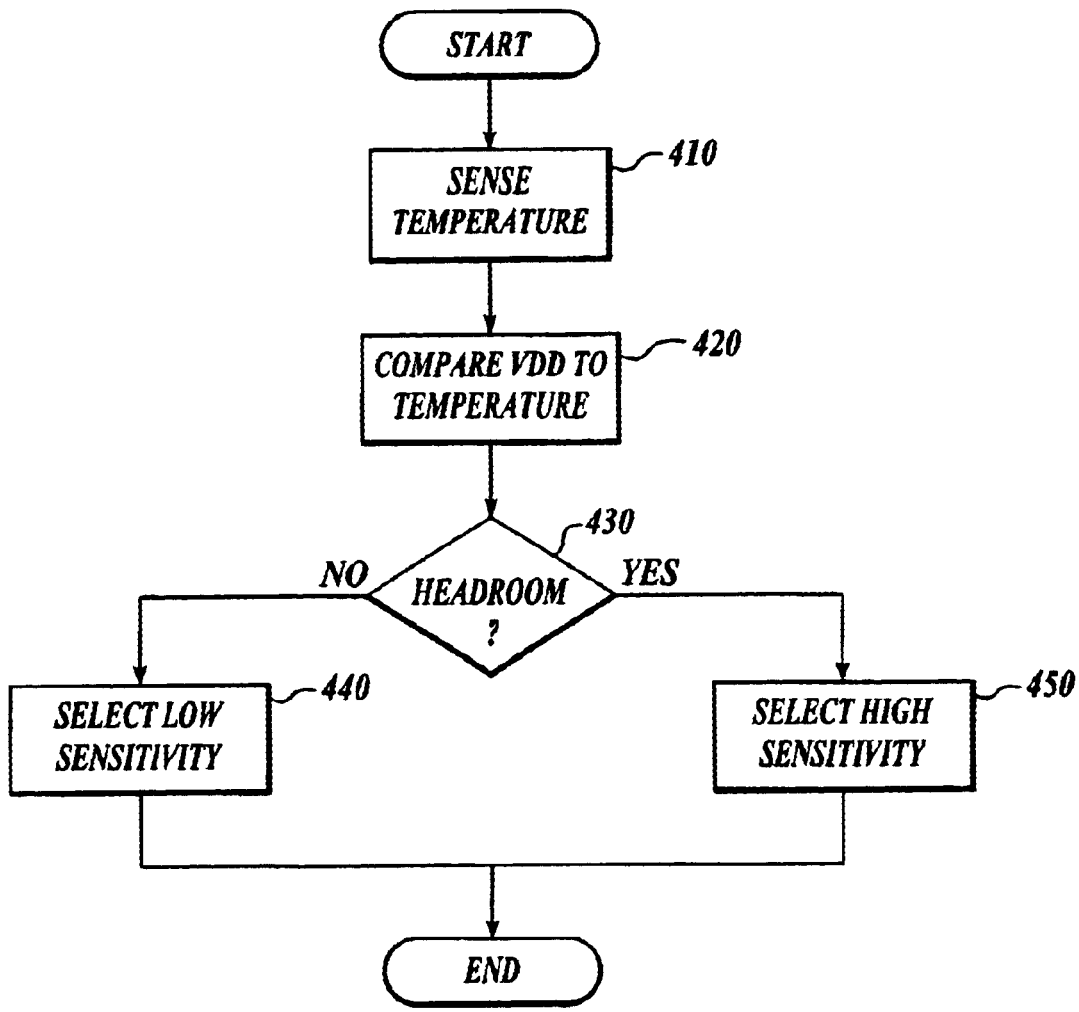
FIG. 4 illustrates a process for controlling a sensitivity switch for a temperature sensor, in accordance with aspects of the invention.

FIG. 4 illustrates a process for automatically selecting the sensitivity of the temperature sensor, in accordance with aspects of the invention.

After a start block, the process moves to block 410 where the temperature is sensed. Moving to block 420, the Vdd is compared to the temperature. Flowing to decision block 430, a determination is made as to whether there is any headroom left. Where there is no headroom, the process flows to block 440 where a low sensitivity state is selected. Where there is headroom, the process flows to block 450 where a high sensitivity state is selected.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for sensing temperature, comprising:

PNP junctions coupled in Darlington connections that are configured to provide a temperature signal that relates to the sensed temperature;

a current source configured to bias the PNP junctions; and at least one switch having at least two states and arranged to block out a predetermined number of the PNP junctions in response to one of the states.

2. The apparatus of claim 1, wherein the switch further comprises an input configured to receive a sensitivity signal relating to a desired state of the switch.

3. The apparatus of claim 2, wherein the two states of the switch include a high-sensitivity state and a low-sensitivity state, wherein the low-sensitivity state relates to blocking out the predetermined number of the PNP junctions.

4. The apparatus of claim 3, further comprising an automatic control circuit arranged to automatically control the state of the switch.

5. The apparatus of claim 4, further comprising a headroom monitor comprising an input coupled to the temperature signal and an input coupled to a Vdd signal, and, in response to a difference between the Vdd signal and the temperature signal, the headroom monitor outputs an out-of-room signal indicating when there is headroom.

6. The apparatus of claim 5, wherein the automatic control circuit further comprises an output configured to output the sensitivity signal and an input coupled to the out-of-room signal; and, in response to the out-of-room signal, the automatic control circuit outputs a sensitivity change signal.

7. The apparatus of claim 1, wherein the state of the switch is hardwired.

8. The apparatus of claim 1, wherein the predetermined number of the PNP junctions that are blocked out is two.

9. The apparatus of claim 1, wherein the number of the PNP junctions coupled in Darlington connections is five.

10. The apparatus of claim 9, wherein the current source configured to bias the PNP junctions comprises a current source for each of the PNP junctions.

11. A method for controlling the sensitivity of a temperature sensor, comprising:

sensing a temperature using PNP junctions coupled in Darlington connections;

comparing a signal from the temperature sensor to a Vdd;

setting at least one switch having at least two states to a state selected from two or more sensitivities; and blocking out a predetermined number of PNP junctions in response to the comparison.

12. The method of claim 11, wherein setting the switch to the state further comprises receiving a sensitivity signal relating to a desired state of the switch.

13. The method of claim 12, wherein the predetermined number of the PNP junctions that are blocked out is two.

14. The method of claim 13, wherein the number of the PNP junctions coupled in Darlington connections is five.

15. The method of claim 12, wherein comparing the signal from the temperature sensor to the Vdd further comprises determining a difference between the Vdd and the signal from the temperature sensor.

16. The method of claim 15, further comprising blocking out the predetermined number of PNP junctions when the difference between the Vdd and the singal from the temperature sensor is below a predetermined value.

* * * * *

UNITED STATES PATENT AND TRADEMARK OFFICE
CERTIFICATE OF CORRECTION

PATENT NO. : 6,867,470 B1
DATED : March 15, 2005
INVENTOR(S) : Lorenz

It is certified that error appears in the above-identified patent and that said Letters Patent is hereby corrected as shown below:

Column 6,
Line 6, "singal" should read -- signal --.

Signed and Sealed this

Twenty-eighth Day of June, 2005

JON W. DUDAS
*Director of the United States Patent and Trademark Office*